United States Patent
Ballew

(10) Patent No.: US 11,796,317 B1
(45) Date of Patent: Oct. 24, 2023

(54) INTERACTIVE SURFACE ELEMENTS FOR LASER BEAM TARGETS

(71) Applicant: Tony J. Ballew, Livingston, MT (US)

(72) Inventor: Tony J. Ballew, Livingston, MT (US)

(*) Notice: Subject to any disclaimer, the term of this patent is extended or adjusted under 35 U.S.C. 154(b) by 304 days.

(21) Appl. No.: 17/013,592

(22) Filed: Sep. 5, 2020

Related U.S. Application Data

(60) Provisional application No. 62/896,274, filed on Sep. 5, 2019.

(51) Int. Cl.
*G01C 15/06* (2006.01)
*G01B 11/27* (2006.01)

(52) U.S. Cl.
CPC .............. *G01C 15/06* (2013.01); *G01B 11/27* (2013.01)

(58) Field of Classification Search
CPC ...... G01C 15/06; G01B 11/27; G01N 23/083; G01N 23/18; A61N 5/1049; A61N 2005/105
See application file for complete search history.

(56) References Cited

U.S. PATENT DOCUMENTS

| | | | | |
|---|---|---|---|---|
| 5,467,193 A | * | 11/1995 | Laewen | G01B 11/27 356/399 |
| 8,419,189 B1 | * | 4/2013 | Deppe | G02B 6/0003 353/31 |
| 2006/0207116 A1 | * | 9/2006 | Vaccaro | G01N 23/083 33/286 |
| 2015/0202463 A1 | * | 7/2015 | Lim | A61N 5/1049 600/1 |
| 2017/0282321 A1 | * | 10/2017 | Wixey | B23B 49/00 |

* cited by examiner

*Primary Examiner* — Sang H Nguyen

(57) ABSTRACT

Surface elements for the face of laser beam targets which more efficiently use the properties of light reflectance and absorption to aid a laser tool operator in accurately directing a laser's beam. The surface elements include beam alignment crosshairs and a background. A light-reflective material makes up or covers the background areas of the face not occupied by the beam alignment crosshairs, and allows the operator to better determine the direction and amount of lateral or vertical movement required for final alignment. The beam alignment crosshairs on the face of the target are formed from non-reflective, light-absorbing material that gives the beam an appearance of vanishing when precisely centered. Coupled with the light-reflective background, the light-absorbent crosshairs remedy multiple detriments from beam spread at greater distances, a weak beam, and a poorly discerned beam from bright or sunlit environments.

7 Claims, 1 Drawing Sheet

INTERACTIVE SURFACE ELEMENTS FOR LASER BEAM TARGETS

CROSS-REFERENCE TO RELATED APPLICATIONS

This application claims the benefit of provisional patent application Ser. No. 62,896,274 filed Sep. 5, 2019

FEDERALLY SPONSORED RESEARCH

Not Applicable

SEQUENCE LISTING OR PROGRAM

Not Applicable

BACKGROUND OF THE INVENTION

Field of Invention

This invention relates to laser-assisted alignment tools, and specifically to laser beam targets.

Prior Art

Over the past 20 years, the use of lasers in the construction trades has increased exponentially. In the early days of their construction-related use, a narrow beam was used to project a level or plumb point of light for marking or measuring purposes. From those single points of light, the optics of laser tools have been refined to the degree that multiple 360° horizontal and vertical lines may be displayed simultaneously.

In the field of steel stud framing, the ability to align such a line-producing vertical beam with a horizontal layout line on the floor of a structure allows the line to effectively be transferred to ceiling surfaces directly over the layout line. In this fashion, bottom and top track components of steel stud framing may be accurately and efficiently installed in correct relation to one another.

Figure 1:
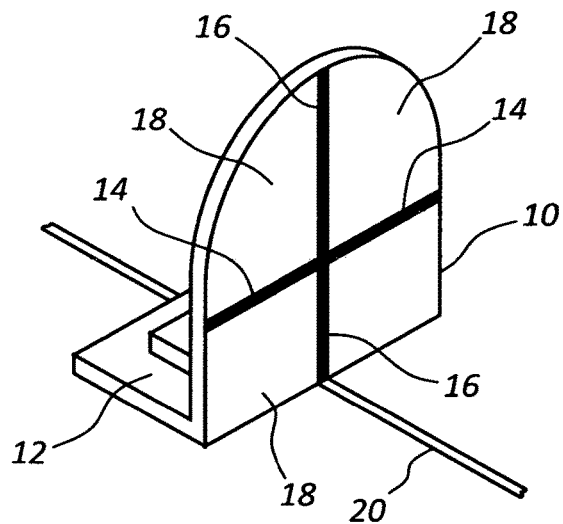

With many lasers, their purchase often includes a target as an accessory. These targets are usually made of plastic and have a foot formed at 90° to the face of the target which allows the face to maintain a vertical orientation on horizontal surfaces, similar to FIG. 2. In addition, magnetic inserts are usually formed into the target by which it may be attached to steel surfaces. The face of the target comprises multiple surface elements. In their standard, deployed orientation, these elements typically include smooth, white-colored beam alignment crosshairs comprising short, horizontal and vertical lines intersecting at their midpoints, in similar fashion as 14 and 16 in FIG. 1. The background of the target's face, similar to 18 in FIG. 1, is often of a matte finish and usually of a color that closely matches that of the laser's red or green beam. Such a color combination of red or green backgrounds coupled with white crosshairs is presumably chosen for the greatest contrast between the background and the crosshairs, with the white crosshairs offering a degree of reflectance.

In steel stud framing, to transfer floor layout lines to ceiling surfaces, the laser is typically set at one end of the chosen layout line. The target is placed at a point on the line away from the laser, and with the vertical portion of the crosshairs aligned directly above the layout line (as in FIG. 1). To increase the accuracy of layout, the target is placed as far away from the laser as possible while still seeing the beam, typically a maximum of sixty to seventy feet.

At close distances, aligning the beam with prior art targets by one person is relatively easy, depending on the user's eyesight. However, at greater distances, many detriments with the prior art targets become evident. Due to the typical target face's background color which matches the beam, when the beam is aimed at the background, it largely vanishes. It is therefore difficult or impossible to know the exact location of the beam and the direction it must move to center on the crosshairs. In addition, as distances between laser and target increase, the laser's beam is gradually weaker. Even if perfectly centered, its position on the crosshairs is increasingly more difficult to discern even with the crosshairs' white color. To compound matters, as distances from the laser increase, the width of the beam also increases. Due to this beam spread, if the edge of such a beam illuminates the crosshairs, it is difficult to know if the beam is truly aligned, and it falsely appears to be centered. Depending on distance and beam spread, this inaccuracy can be significant. These detriments are even more pronounced in bright or sunlit conditions by diminishing the ability to discern the beam, and thus require the target to be repositioned closer to the laser.

Due to the detriments and limitations noted above and because accuracy is essential, a second person is often positioned at the target to sight the beam while the laser operator follows visual or verbal cues to adjust the beam's alignment. In situations where a second person is unavailable, the laser operator must make numerous trips between the laser and target to precisely align the beam. These multiple trips between laser and target for minute corrections collectively consume valuable man-hours and substantially decrease productivity. Although use of a second person to sight the beam at the target saves multiple trips and increases productivity, the use of a second person is in itself a significant expenditure.

One alternative to the use of a second individual positioned at the target is the use of an electronic sensor, which senses precise alignment of the beam and audibly cues the operator when alignment is attained. These sensors, however, can be costly. As such, they are seldom included with laser kits but are offered as an up-charge accessory. Currently, there are no non-electronic laser beam targets known that address and rectify the above-noted detriments.

BACKGROUND OF INVENTION—OBJECTS AND ADVANTAGES

Accordingly, several objects and advantages of the present invention are to provide interactive surface elements for laser beam targets by which to accurately align the beam of a laser tool; and (a) which are a low-technology alternative to electronic sensor style targets, (b) which are a low-cost alternative to electronic sensor style targets, (c) which have a background on which off-center beam position is more readily identified, (d) which have alignment crosshairs on which a centered beam is readily discerned at greater distances, (e) which have alignment crosshairs on which a centered beam is readily discerned in bright environments, (f) which eliminate multiple trips between laser and target for proper alignment by a single operator, and (g) which eliminate the need for multiple personnel to center the laser's beam.

SUMMARY

Surface elements for the face of laser beam targets which more efficiently use the properties of light reflectance and absorption to determine a laser beam's position. Beam alignment crosshairs on the face of a target are formed from non-reflective, light-absorbing material. A light-reflective material makes up or covers areas of the face not occupied by the alignment crosshairs.

DRAWINGS—FIGURES

Figure 2:
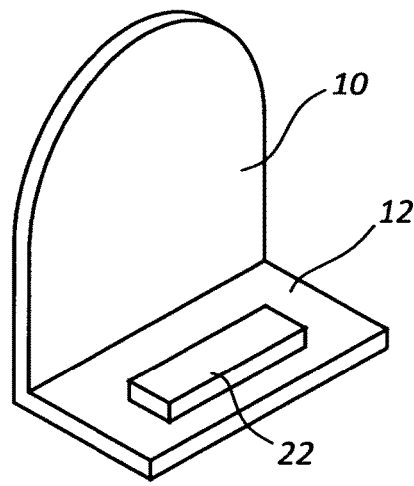
Figure 3:
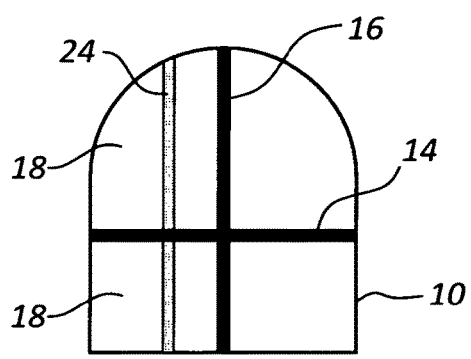
Figure 4:
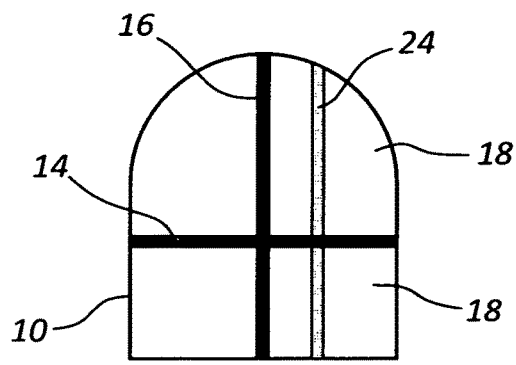
Figure 5:
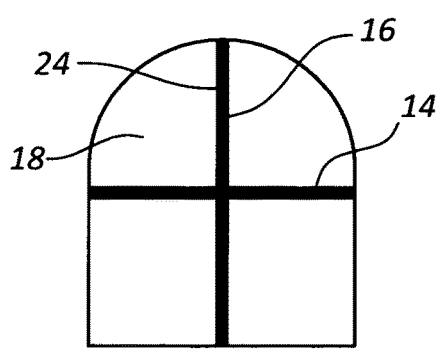

FIG. 1—Preferred embodiment of the laser target in position over a horizontal layout line on a floor surface FIG. 2—Rear view of the preferred embodiment showing magnet location FIG. 3—Front view of the laser target with laser line to left of crosshairs, layout line not shown FIG. 4—Front view of the laser target with laser line to right of crosshairs, layout line not shown FIG. 5—Front view; laser beam aligned on crosshairs; laser beam appears to vanish (layout line not shown)

DRAWINGS—REFERENCE NUMERALS

10—Laser target, vertical face
12—Laser target, horizontal foot
14—Horizontal portion of light-absorptive crosshairs
16—Vertical portion of light-absorptive crosshairs
18—Light-reflective material
20—Layout line
22—magnet
24—Laser beam, crossing the target's face

DETAILED DESCRIPTION—PREFFERED EMBODIMENT—FIG. 1

A non-reflective, laser light-absorbent material such as the loop portion of hook and loop tape; duvetyn fabric; or flat black paint is applied to the vertical face 10 of a laser beam target in such a fashion as to create horizontal 14 and vertical 16 crosshair lines of similar width as the laser's beam. A highly light-reflective material 18 which is equally effective with different colors of laser beams, such as 3M™ Scotchlite™ safety reflective tape or an equivalent, is applied to the remainder of the vertical face to which the light-absorbent crosshair material has not been applied.

OPERATION—PREFERRED EMBODIMENT—FIGS. 1, 3, 4, 5

To align a laser beam with a horizontal layout line 20 on a floor surface, as seen in FIG. 1, the face of a laser target 10 is placed into position at the desired location over the layout line 20. The crosshairs 14 and 16 face toward the laser's position with the vertical portion of the crosshairs 16 aligned with the layout line 20 as shown. The laser is placed into position at its desired location over the layout line per manufacturer instructions with its beam directed toward the target. When the beam is reflected from the target's background, the beam is in close proximity to precise alignment. If the beam 24 is to the left of the vertical portion 16 of the crosshairs, as in FIG. 3, the laser and its beam are pivoted to the right. If the beam 24 appears to the right of the vertical portion of crosshairs 16, as in FIG. 4, the laser and its beam are pivoted leftward. When the beam 24 is thus positioned at the center of the target is substantially diminished or appears to completely vanish, the laser and its beam are precisely aligned with the floor's layout line. In situations where beam spread renders an overlapped or "spilled" beam wider than a crosshair, the beam is pivoted into a position in which the spill onto the reflective background is the same size and intensity on both sides of the light-absorptive crosshair. In this fashion, the general direction of beam adjustment, exact beam centering, and the need for minute adjustments is easily discerned and readily accomplished by one person, and over greater distances.

CONCLUSION, RAMIFICATIONS, AND SCOPE OF INVENTION

Thus the reader will see that the tool of the present invention provides a compact, non-electronic device that is specifically designed for instantly and easily discerning the position of a laser beam in order to attain correct beam alignment, that rectifies detriments to prior art targets, that reduces the number of personnel required for laser setup, and that reduces laser setup time.

While my above description contains many specificities, these should not be construed as limitations on the scope of the invention, but rather as an exemplification of one preferred embodiment thereof. Many other variations are possible. For example, specific light-reflective and light-absorptive materials are mentioned. It is quite probable that other materials with greater absorption or reflectance of laser beams are available but unknown to the applicant. Also, the preferred embodiment shows horizontal and vertical crosshairs. In many applications, only one crosshair is necessary.

In addition, the face of the target could further include adjustable width crosshairs. Such a feature could be constructed in rudimentary fashion with individually manipulated background elements, or be based on a geared aperture-style adjustment mechanism. In either case, the reflective background sections of the target may be moved closer to the center of the target, or farther from center thus effectively narrowing or widening the crosshair width. This feature would allow fine adjustments of the crosshair width to match the beam widths of various brands of lasers or to match the width of a beam due to beam spread.

Accordingly, the scope of the invention should be determined not by the embodiments illustrated, but by the appended claims and their legal equivalents.

I claim:

1. A laser beam target for steel framing layout duties having a predetermined shape and configured so that when said target is positioned onto a layout line of predetermined length, a plurality of specific, laser light reactive substances comprising a plurality of specifically-oriented surface elements oriented on a face of said target are capable of displaying a novel visual cue to a human operator of a laser light-emitting laser tool when a beam of laser light being emitted from said laser tool is directed onto said surface elements so that said operator is capable of precisely aligning said beam into an orientation that is parallel to said layout line;
   (A) said predetermined shape of said target comprising a
       contact edge that is (1) capable of substantially contacting said layout line at a working angle defined as substantially perpendicular to a surface on which said layout line exists; and (2) capable of supporting said face of said target at said working angle without an additional aid;

(B) said laser light reactive substances comprising a laser light reflective material and a laser light non-reflective material, said laser light non-reflective material having a physical property capable of diminishing a visible appearance of said beam so that a reflectance of said beam from said non-reflective material is substantially indiscernible to a naked eye of said operator, said operator having an ordinary visual ability; said laser light reflective material having a physical property capable of reflecting a visible appearance of said beam so that a reflectance of said beam from said reflective material is substantially visible to said naked eye of said operator;

(C) said surface elements comprising a minimum of one target crosshair and a target background, said crosshair being of a predetermined width and a predetermined length, said predetermined width of said crosshair being substantially equivalent to a width of said beam, said predetermined length being limited by a perimeter size of said target, said crosshair further comprising said laser light non-reflective material; said background being oriented substantially adjacent to said crosshair, said background also substantially occupying a surface area of said face of said target not occupied by said crosshair, said background further comprising said laser light reflective material;

(D) the specific orientation of said surface elements comprising an orientation of said crosshair (1) so that an end of said crosshair substantially contacts said layout line, (2) so that the length of said crosshair is oriented at an angle congruent with said working angle, and (3) so that said crosshair is oriented in a substantially central orientation on said face;

whereby when said beam is precisely in alignment with said crosshair, (a) said beam displays a characteristic of vanishing, said characteristic of vanishing being said novel visual cue whereby (b) said operator is capable of precisely aligning said beam into said orientation that is parallel to said layout line without an assistance from an additional human, and whereby (c) said operator is capable of precisely aligning said beam of laser light into said orientation that is parallel to said layout line (i) when said operator is in such a proximity to said laser tool that said operator is capable of physically contacting said laser tool for a purpose of aligning said laser tool;

(ii) while said operator maintains a contact with said laser tool throughout a process of aligning said laser tool into said orientation that is parallel to said layout line; and (iii) when said target is at a furthest distance from said laser tool at which said operator is capable of visually discerning said reflectance of said beam from said background of said target (iv) when an alignment procedure is being performed under bright or sunlit conditions.

2. The target crosshair of claim 1 wherein said laser light non-reflective material comprises a loop portion of hook and loop tape.

3. The target crosshair of claim 1 wherein said laser light non-reflective material comprises duvetyn fabric.

4. The target crosshair of claim 1 wherein said laser light non-reflective material comprises flat black paint.

5. The target background of claim 1 wherein said laser light reflective material comprises safety reflective tape.

6. The surface elements of claim 1 wherein said laser light reflective material comprises gloss white paint.

7. A laser alignment process for aligning a laser beam into an orientation that is parallel to a layout line on a horizontal surface comprising the steps of:

providing said horizontal surface;
providing said layout line;
providing a laser beam emitting laser tool;
centering said laser tool onto said layout line;
providing a laser target that includes a face, said face having a crosshair;
centering said target onto said layout line into an orientation so that said face is oriented toward said laser tool;
pointing a laser beam from said laser tool at said target;
laterally adjusting said laser beam onto said target until a reflection of said laser beam appears to vanish.

* * * * *